United States Patent
Gray et al.

[19]

[11] Patent Number: 6,109,691

[45] Date of Patent: Aug. 29, 2000

[54] SEAT AND OCCUPANT SAFETY SYSTEM

[75] Inventors: Mark F. Gray, Sterling Heights; Kenneth H. Kohlndorfer, Roseville, both of Mich.

[73] Assignee: Breed Automotive Technology, Inc., Lakeland, Fla.

[21] Appl. No.: 08/955,844

[22] Filed: Oct. 21, 1997

[51] Int. Cl.[7] ....................................................... B60N 2/42
[52] U.S. Cl. ................................. 297/216.17; 297/344.15
[58] Field of Search ......................... 297/344.15, 344.18, 297/216.1, 216.16, 216.17, 216.19, 216.2, 475, 483; 248/125.1, 404, 421, 188.2; 296/68.1

[56] References Cited

U.S. PATENT DOCUMENTS

| | | |
|---|---|---|
| 2,527,905 | 10/1950 | Barecki . |
| 2,861,627 | 11/1958 | Smith . |
| 4,784,434 | 11/1988 | Iwami . |
| 5,005,894 | 4/1991 | Nagata . |
| 5,324,095 | 6/1994 | Yamauchi ...................... 297/216.16 X |
| 5,451,094 | 9/1995 | Templin et al. . |
| 5,642,916 | 7/1997 | Dybro et al. . |

FOREIGN PATENT DOCUMENTS

58199231  11/1983  Japan .

*Primary Examiner*—Milton Nelson, Jr.
*Attorney, Agent, or Firm*—Markell Seitzman

[57] ABSTRACT

A restraint system having a seat (20) and a seat suspension mechanism (40) for supporting the seat and permitting the seat to move relative to a vehicle floor, the seat suspension mechanism including two movable members (52,54) which move apart as the seat is moved closer to the floor. A seat lowering activator (100) is connected to the seat suspension mechanism for urging the movable members apart thereby forcibly urging the seat to a lower position relative to the floor during an emergency.

12 Claims, 10 Drawing Sheets

SEAT AND OCCUPANT SAFETY SYSTEM

BACKGROUND AND SUMMARY OF THE INVENTION

This invention generally relates to safety devices for vehicles and more particularly to a force transmitting device which will limit and control the motion of a vehicle seat during a crash and more particularly to a seat retracting device which when activated causes the seat to be lowered during a crash and held at a preferred height.

Seats used in large trucks are often supported by a suspension and support mechanism that permits the seat to move or be moved over a range of positions relative to the vehicle floor. Typically the seat suspension mechanism includes a shock absorber to damp the oscillations of the seat and support mechanism as well as an air cushion which acts as a spring. The seat suspension mechanisms used in many trucks may also permit the seat to slide or float horizontally (upon the mechanism) in a somewhat uncontrolled manner in response to forces applied by the occupant or driver.

It is an object of the present invention to provide a force transmitting or seat retracting mechanism which is capable of drawing the seat toward the floor and one which optimally maintains the seat at a predetermined lowered position relative to the floor during and after an accident.

The prior art shows a number of ways of restraining the motion of a truck seat. As an example U.S. Pat. No. 5,642,916 discloses a tethering system which includes a retractor that is secured to the seat which prohibits movement of the seat during an accident. U.S. Pat. No. 5,451,094 illustrates another seat controlled system in which a fluid cylinder is mounted exterior to the seat and support mechanism and which when activated pulls the seat down toward the floor. A deficiency of the above type of configurations is that space is required to mount those additional components outside of the profile of the seat and/or its suspension.

Accordingly the invention comprises: a seat; a seat suspension means for supporting the seat and permitting the seat to move relative to a vehicle floor. The seat suspension means includes support element means comprising at least one movable member which moves as the seat is moved closer to the floor and seat lowering means connected to the support element means for forcibly moving the movable member to thereby lower the position of the seat relative to the floor to the first determinable position. The invention optionally includes lock means for maintaining the seat lowering means at a position corresponding to the lowered seat position.

Many other objects and purposes of the invention will be clear from the following detailed description of the drawings.

BRIEF DESCRIPTION OF THE DRAWINGS In the drawings.

DETAILED DESCRIPTION OF THE DRAWINGS

Figure 1:
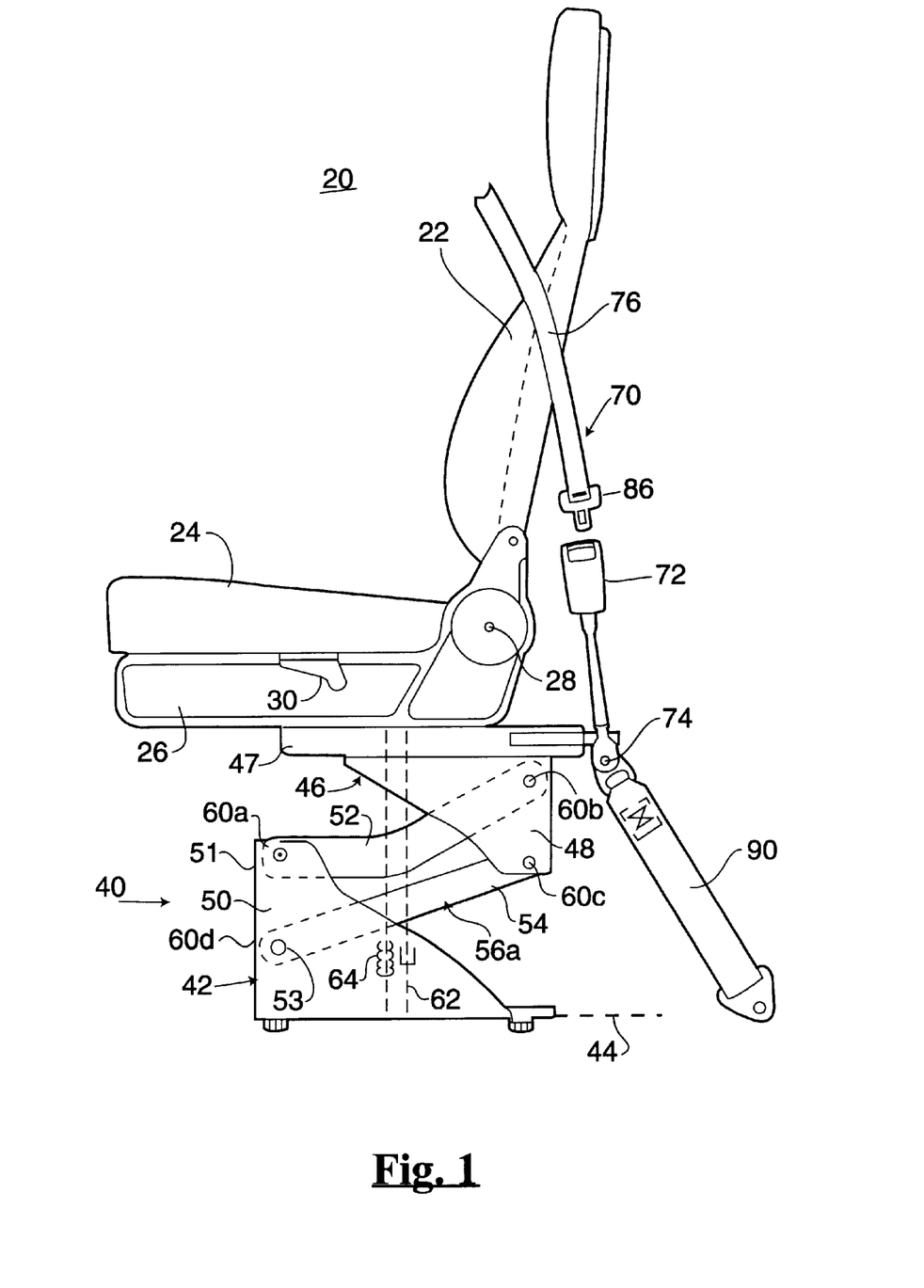
FIG. 1 illustrates a side view of a typical large vehicle seat utilizing the present invention.
Figure 2:
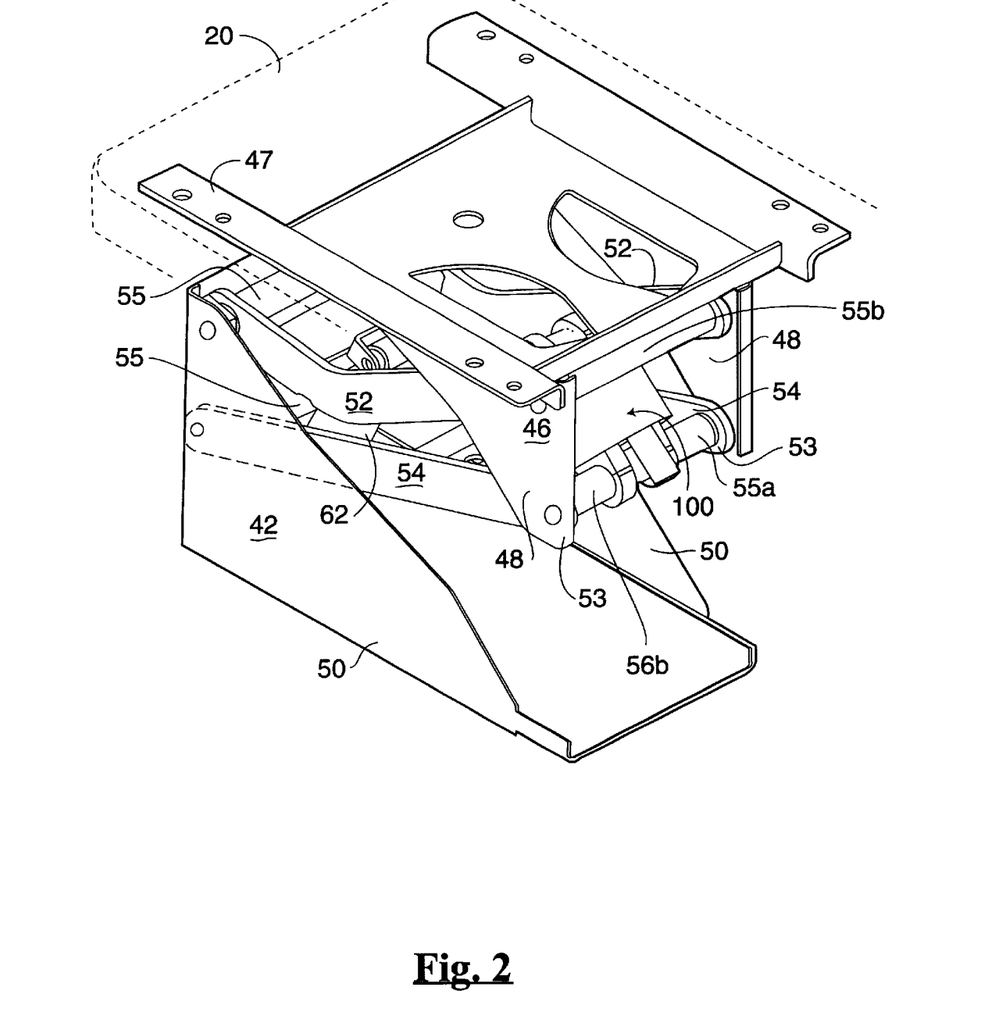
FIG. 2 is an isometric view of a seat suspension assembly for protecting a seat occupant.
Figure 3:
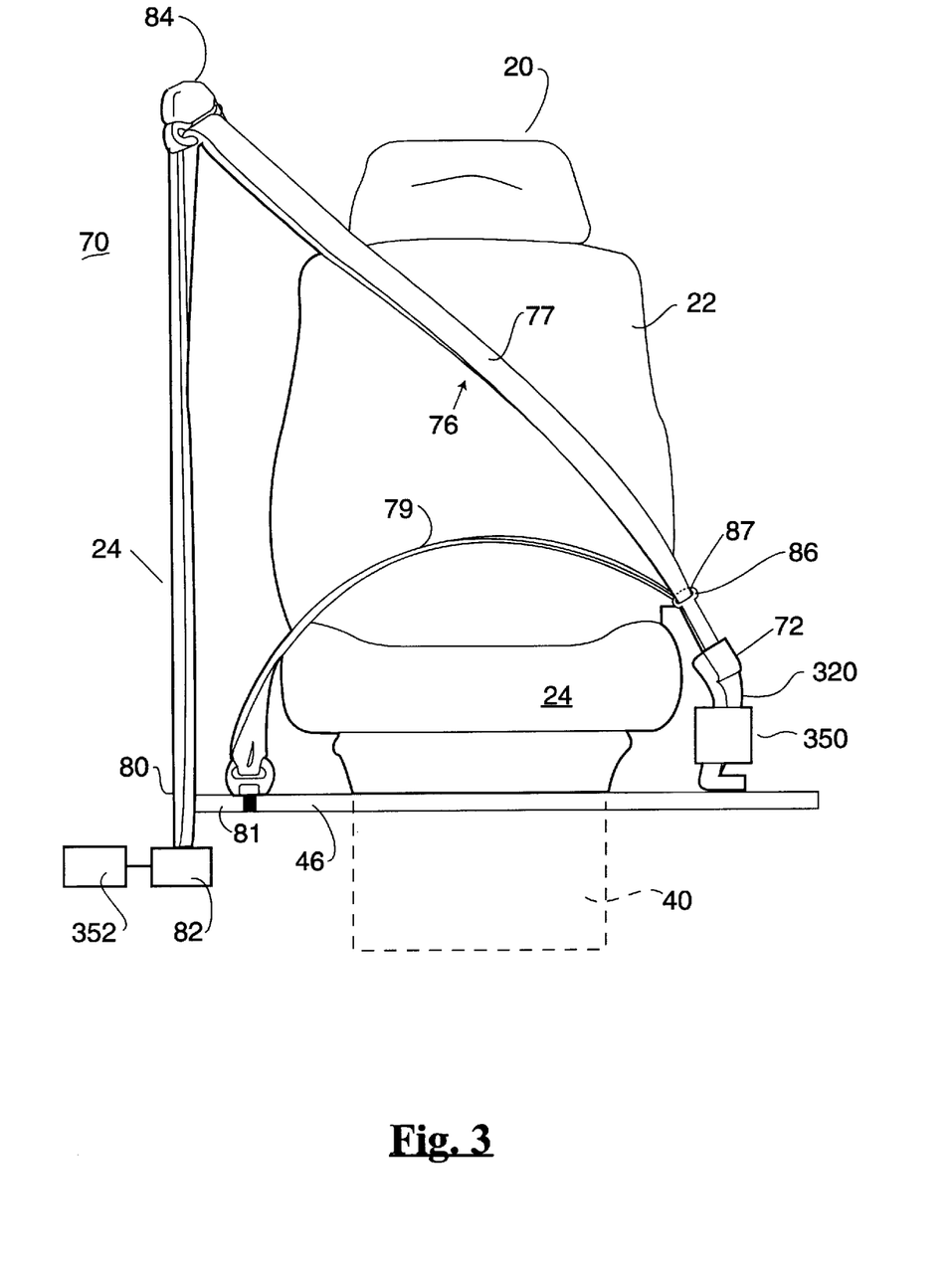
FIG. 3 shows a typical seat belt occupant restraint system.

Reference is made to FIGS. 1–3 which show a vehicle seat 20 illustrative of those used in large over-the-road trucks. As the construction of these types of seats is generally well known, it will not be described in exacting detail. The seat 20 comprises a seat back 22 and seat cushion 24. The seat cushion may be received within a seat frame part 26 and the seat back may be articulated at 28 relative to the frame part 26. Various mechanisms such as a release latch 30 may be included in the seat to permit the seat back to articulate to a number of positions so that it might be positioned at a more comfortable angle for the particular driver/occupant. The seat 20 is mounted upon a suspension assembly generally shown as 40. The suspension assembly includes a lower seat suspension frame or part 42 appropriately secured to the vehicle floor 44. An upper seat suspension frame or part 46 is provided to support the seat 20 or seat frame part 26. As is known in the art the seat frame part 26 may be permitted to slide or float upon the upper seat suspension frame or part 46. The upper seat suspension part 46 includes an upper mounting frame 47 and two depending side walls 48 (also shown in FIG. 2). The lower seat suspension part 42 includes two upraised side walls 50 and a front wall 51 (also shown in FIG. 2). The upper suspension part 46 (including the side walls 48) and the lower suspension part 42 (including the side walls 50) are connected together by two sets of beams or bars 52 and 54. The upper and lower ends of each of the bars 52 and 54 are connected to and separated by a respective spacer bar 55 which is supported on frames 42 and 46. These beams 52 and 54, in cooperation with portions of the side walls 48 and 50, form two spaced, four-bar linkages generally designated as 56a and 56b. As can be appreciated, the beams 52 and 54 (of each four-bar linkage) are connected to the upper and lower suspension frames or parts 42 and 46 at hinge points 60a–60d. If the sides of the frames 42 and 46 are not sufficiently rigid, four reinforcement links 51 can be secured, in a vertical orientation on the inside of the frame parts 42 and 46 to reinforce same. In this situation the upper and lower bars 52 and 54 respectively would be connected to and would rotate relative to a corresponding reinforcement bars 51 instead of being connected directly to the frame parts 42 and 46. The above support structure or assembly 40 is generally known in the art may include a shock absorber 62 to damp the oscillatory motion of the structure 40 as well as include a spring 64 (shown schematically in FIG. 1) which may be a conventional coiled spring or an air spring which, under separate control, can be inflated and deflated so that the driver can vary or adjust the height of the seat 20 at a comfortable position under control of a known type of height adjusting controller. The shock absorber 62 and spring 64 are shown schematically in FIG. 1 and may be connected to any appropriate structure in the assembly 40. The seat 20 and/or support assembly 40 may additionally include a safety belt system (see FIG. 3) generally identified as 70 to secure the occupant within the seat. This system 70 may comprise a buckle 72 secured to the upper seat suspension part 46 or bracket 47 (or extension thereof) at location 74 and a length of seat belt webbing 76 which is secured at one end 80 of a seat belt retractor 82. The shoulder belt portion 77 of the seat belt webbing 76 is also threaded through a web guide or D-ring 84 (attached to a B-pillar of the vehicle of the vehicle or to or integrated into the seat) as is typical of a three-point safety restraint system. The lap belt portion 77 is secured to the frame part 46 at 81. A tongue 86 is positioned on the webbing 76 for insertion into the buckle. The upper seat suspension part 46 or buckle 72 is further secured to the vehicle floor through a tether or strap 90 (see FIG. 1). As mentioned, in some truck installations the seat 20 or support 40 is constructed to permit the seat to float fore and aft. The tether or strap 90 limits the amount that the seat is permitted to float in forward and aft directions.

Figure 4A:
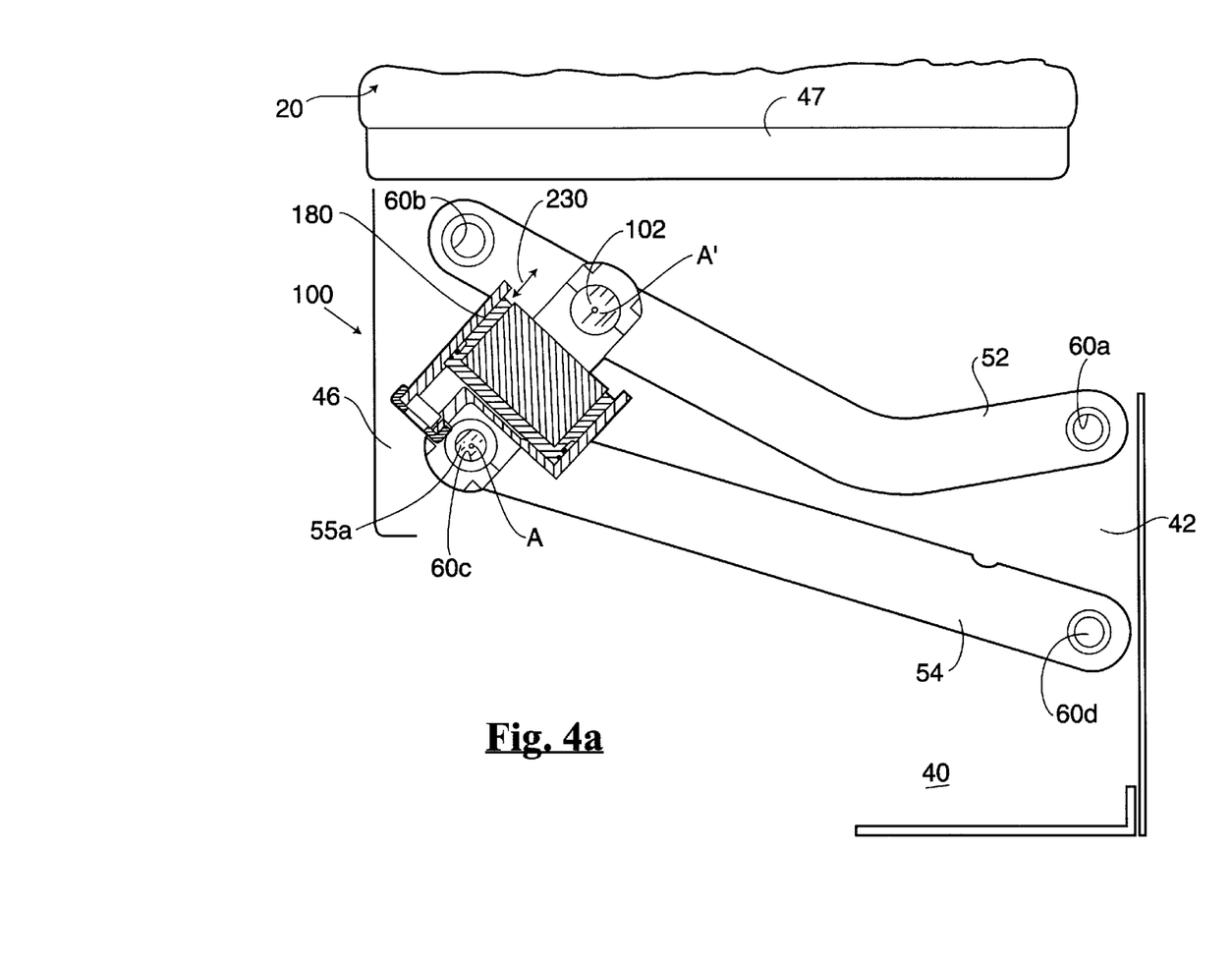
FIGS. 4a and 4b are partial side views, based upon FIG. 1 which illustrates the seat in a raised and lowered position.
Figure 4B:
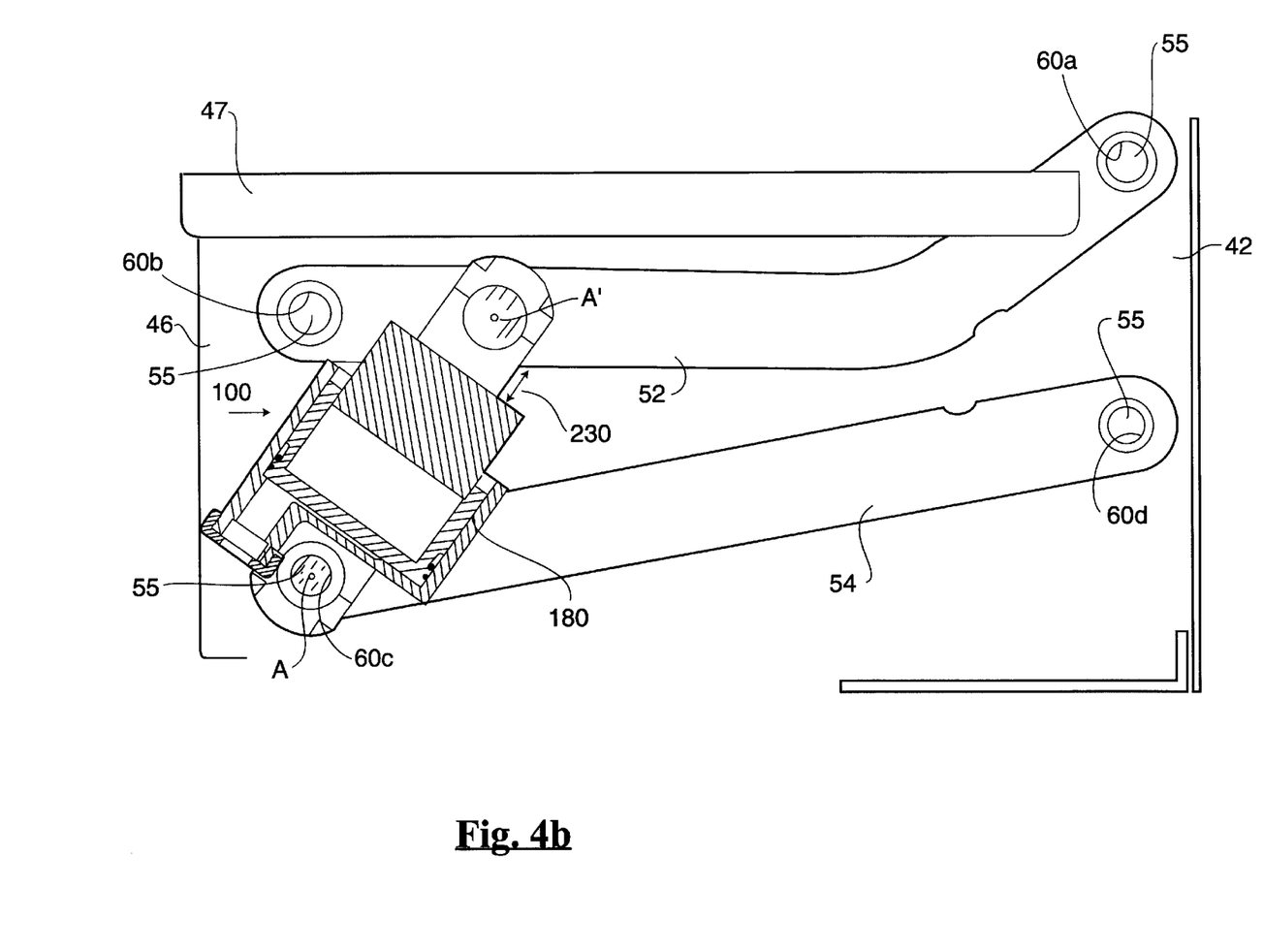

Reference is briefly made to FIGS. 4a and 4b which are partial side views of the seat 20 and support structure 40 illustrated in FIG. 1 illustrating the movement of the two sets of bars 52 and 54. As can be appreciated the upper and lower frame parts 42 and 46 are only schematically shown. FIG. 4a and 4b respectively show the seat is an elevated and in a lowered position (relative to the floor). As can be appreciated, as the seat is raised and lowered the various pairs of beams 52 and 54 (associated with each four-bar linkage) rotate about their respective hinge points 60a–60d. As the seat 20 moves up and down, the relative spacing between bars 52 and 54 vary. More specifically, as the seat 20 is lowered the spacing, that is the linear distance between points A and A' on the bars 52 and 54 increases (see FIG. 4a and 4b). This feature will be utilized by the force transmitting or seat retracting mechanism 100 described below. Basically, the seat retracting mechanism 100 is inserted between the lower and the upper pairs to bars 52 and 52. Upon activation of the force transmitting mechanism 100, the various bars will be urged apart thereby forcing the seat 20 to be moved downwardly to its desired, retracted position. As will be seen from the description below the seat retracting mechanism 100 is located between one of the cross-bars 55 (joining the lower ends 53 of bars 54) and an additional crossbar 102 (which spans opposing upper bars 52).

Figure 5:
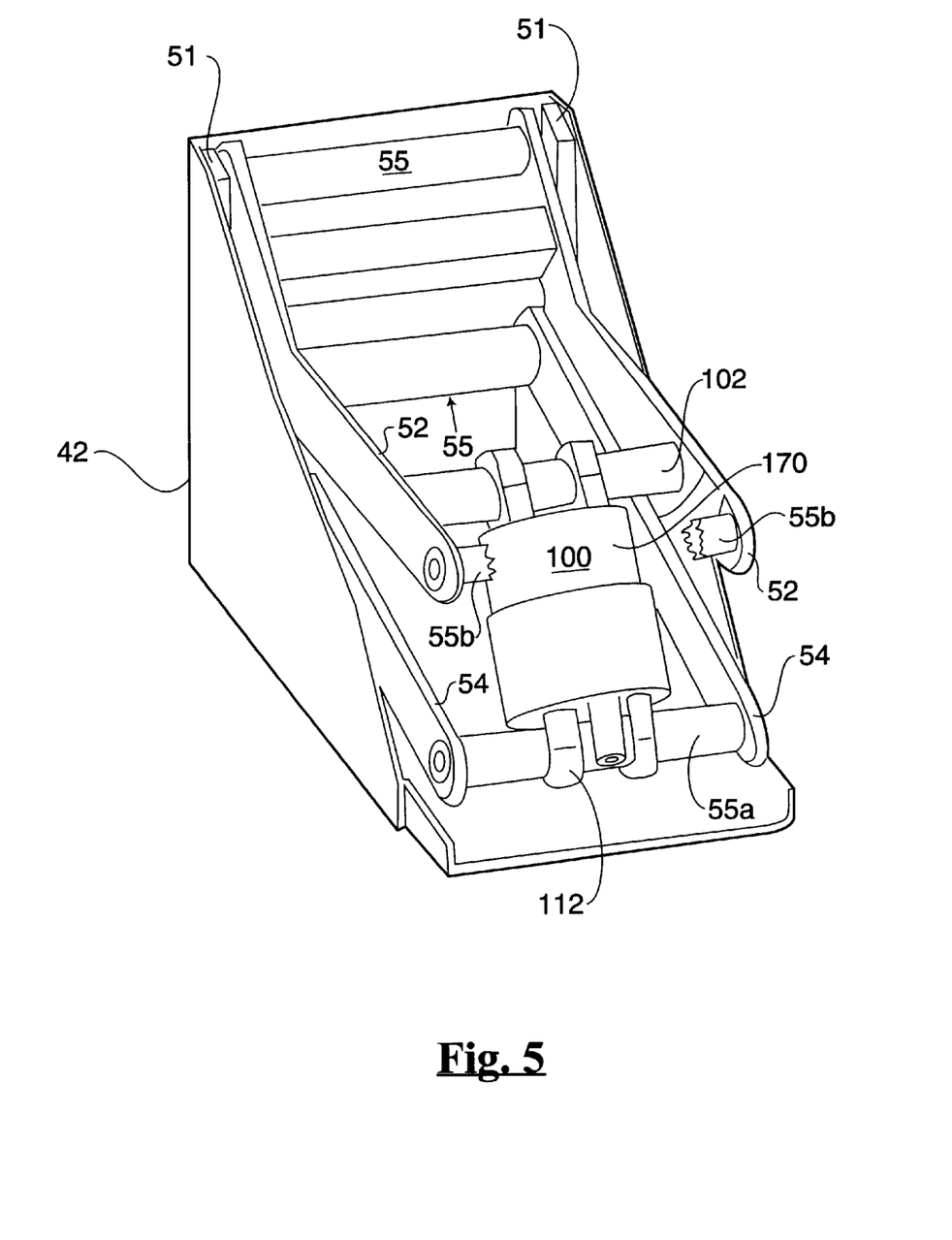
FIG. 5 schematically shows a seat retracting device within a seat support assembly.

Reference is briefly made to FIG. 5 which illustrates the seat retracting mechanism 100 in position within the support assembly 40. As illustrated the suspension 40 is in its lowered position which corresponds to a raised seat 20 position. In one embodiment of the invention a single seat retracting mechanism 100 is positioned mid-way between the two pairs of bars 52 and 54 within the support assembly 40. This is accomplished using a cross-rod 102, of circular cross-section which links the spaced upper bars 52. As mentioned above a spacer bar 55a links the spaced lower bars 54. An upper spacer bar 55b is shown segmented so that the mechanism 100 is more clearly visible. The seat retracting mechanism 100 is attached to the mid-point of the cross-bar 102 and to the mid-point of the spacer bar 55, however, it may also be positioned off-center or even adjacent one of the pairs of bars 52 and 54.

Figure 6:
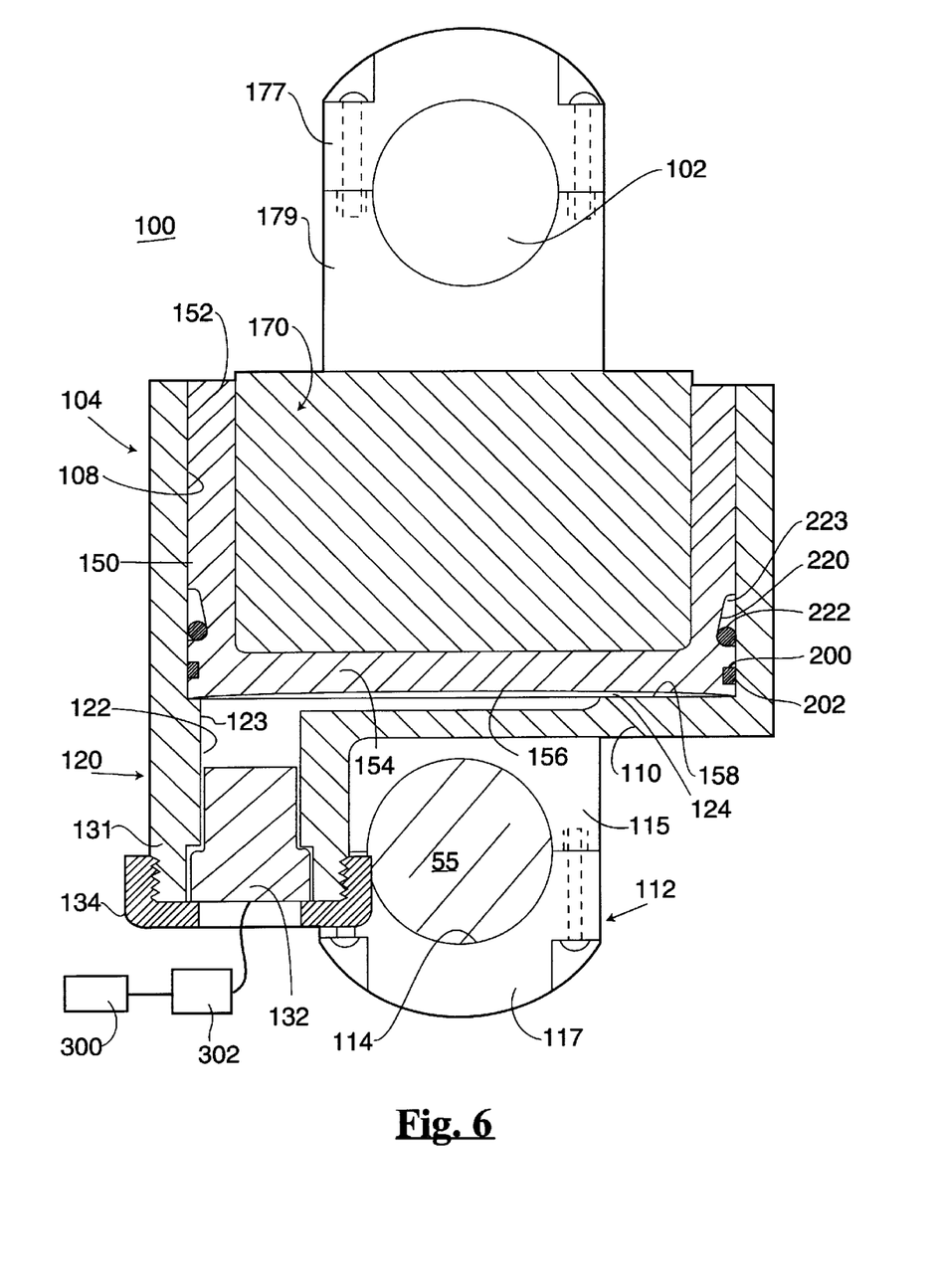
FIGS. 6, 7 and 8 illustrate a cross-sectional view, top plan view and a bottom plan view of a force transmitting or seat retraction mechanism constructed in accordance with the present invention.
Figure 7:
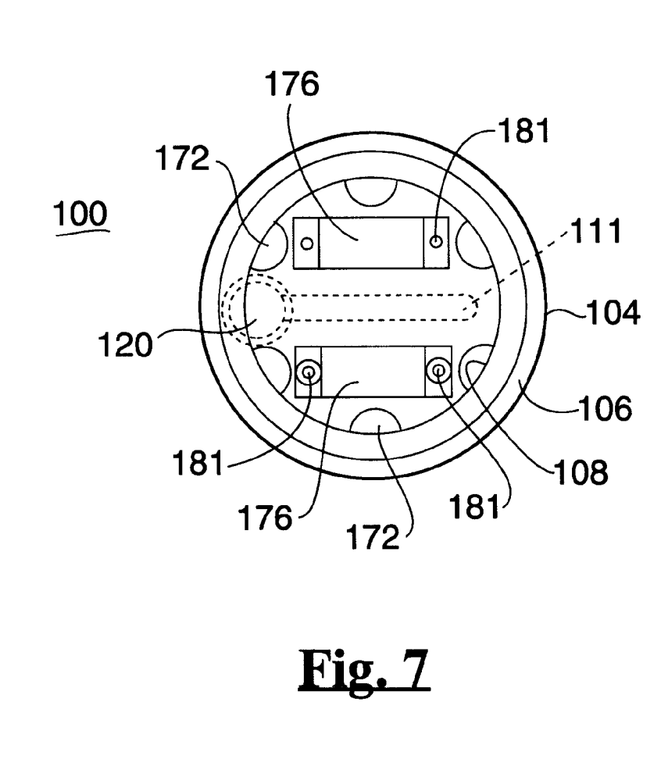
Figure 8:
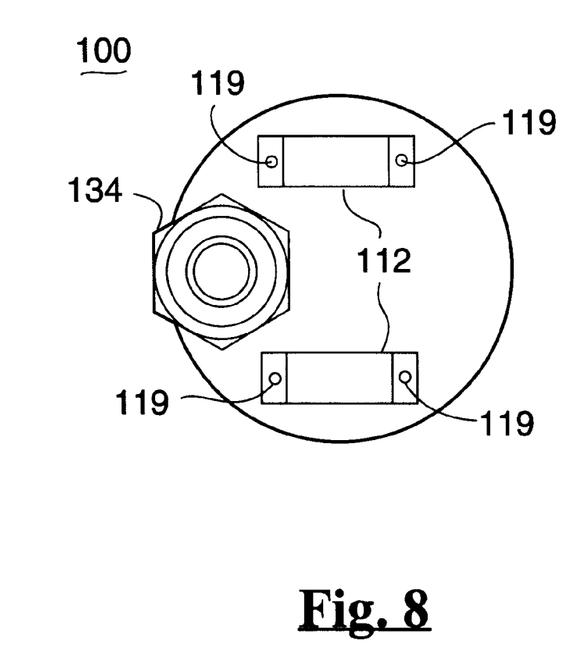

Reference is now made to FIGS. 6–8 which illustrate details of the force transducing or seat retraction mechanism 100 referred to above. The seat retracting mechanism 100 comprises an outer housing 104 having a cylindrical wall 106 with a generally smooth inner surface 108. The housing 104 further includes a bottom 110 and two parallel spaced, lower mounting links or brackets 112. As can be seen, each lower mounting link or bracket 112 includes a mounting hole 114 to facilitate the mounting of the seat retractor 100 to the cross-bar 55b of the suspension 40. The links 112 are formed as a clam shell clamp having an upper part 115 secured to a lower part 117 by appropriate fasteners 119.

Figure 9:
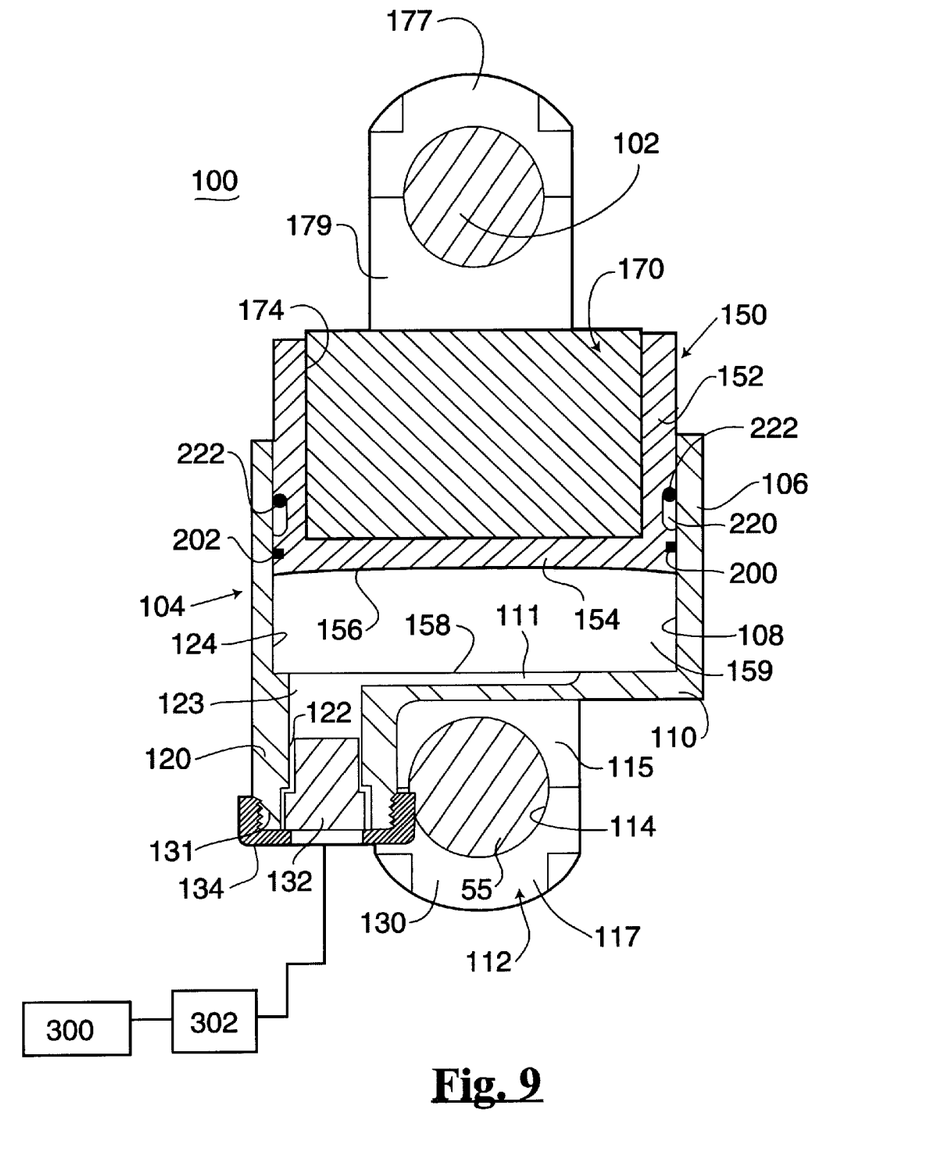
FIG. 9 shows a seat retraction mechanism in its fully extended position.

The housing 104 further includes a cylindrical extension 120 defining a passage or bore 122, one end 123 of which terminates at a piston receiving cavity 124 formed by the wall 106 and bottom 110. The bottom 110 includes a groove 111 (see FIG. 7) which receives gases generated by a pyrotechnic gas generator 132. The pyrotechnic gas generator 132, of known construction, is secured to another end 131 of the cylindrical extension 120 by a fastening means generally shown as 134. Positioned within the cup-shaped piston receiving cavity 124 is a cup-shaped piston generally shown as 150. The piston is shown in FIG. 9. The piston includes a cylindrical wall 152 which terminates at a bottom 154. As can be seen in FIGS. 6 and 9, the outer surface 156 of the bottom faces a corresponding inner surface 158 of the bottom 110 (of the housing 104). The surface 156 of the piston 150 is concavely shaped which assists in defining an expansion chamber 159 between the housing 104 and the piston. As can be seen from FIG. 7, this chamber 159 communicates with passage 122.

Situated within the piston 150 is a cylindrically-shaped connecting rod 170. The connecting rod 170 includes a plurality of cutouts 172 (see FIG. 7) which run along the exterior, axial length of the connecting rod to remove a portion of the exterior surface area of the connecting rod 170 to reduce resistance to its movement due to trapped air and to reduce sliding friction. The connecting rod 170 further includes two parallel spaced connecting links 176 which are secured generally at center 178 of the bar 102. The connecting links 176 are also of clam-shell construction having a upper part 177 secured to a lower part 179 by cooperating fasteners 181 (which are shown in greater detail in FIG. 9).

The housing 104 and piston 150 cooperate to provide a seal therebetween. One such seal can be accomplished by fabricating a peripheral groove 200 within the piston and fitting therein a resilient O-ring 202. Further, as can be appreciated from the description above, the piston 150 is designed to slide relative to the surface 108 of the housing 104. The housing 104 and piston 150 further include a means for stopping the motion of the piston 150 relative to the housing 104. This motion stop is accomplished by utilizing a jamming device. One means of implementing this motion stop is to fabricate within the housing wall 108 or the exterior wall of the piston 150 a peripheral groove 220. Positioned within the groove 220 are wedges or balls 222. The piston 150 is shown in its locked (jammed), extended position in FIG. 9. As will be seen from the discussion below the piston 150 is forced outwardly from the housing 104 upon activation of the gas generator 132. Thereafter any inward motion of the piston 150 causes the wedges or balls to be jammed within the narrowed portion 223 thereby limiting the motion of the piston and locking the piston in place near or at its point of maximum travel. Further, as will be seen, the connecting rod 170 is free to move in and out of the internal cavity 180 formed by the piston walls 152 and bottom 154 as the various pairs of bars 52 and 54 move in relation to one another.

The operation of the present invention is as follows. During the normal operation of the vehicle, as the driver sits upon the seat and/or controls the height of the seat relative to the floor, the various bars 52 and 54 of the suspension unit 40 will move together and apart defined by the geometry of the four-bar linkage 62. During this mode of operation, the connecting rod 170, which is connected to cross-bar 102, will slide in and out (see arrow 230) of the piston 150 as the bars 55a and 102 move relative to one another as shown in FIGS. 4a, 4b and 9.

FIG. 4a shows the connecting rod 170 bottomed out within piston 150 which corresponds to the maximum height setting of the support assembly 40 (and seat 20) where the spacing between bars 55 and 102 is the smallest. FIG. 4b also shows the seat suspension assembly 40 in its position in which the seat 20 is at its lowest level. In the condition the bars 55a and 102 are at their maximum relative spacing. As can be seen the connecting rod 170 has been pulled partially out of the piston 150, the gas generator has not yet been fired, and the piston 150 is still resting within the housing 104. During an accident, which is appropriately sensed by one or more crash sensors 300, an electronic control unit 302 (see FIG. 6) generates a signal activating the pyrotechnic gas generator 132. The products of combustion produced by the gas generator flow through bore 120 and enter into the chamber 159 thereby urging the piston 150 rapidly outwardly.

Figure 10:
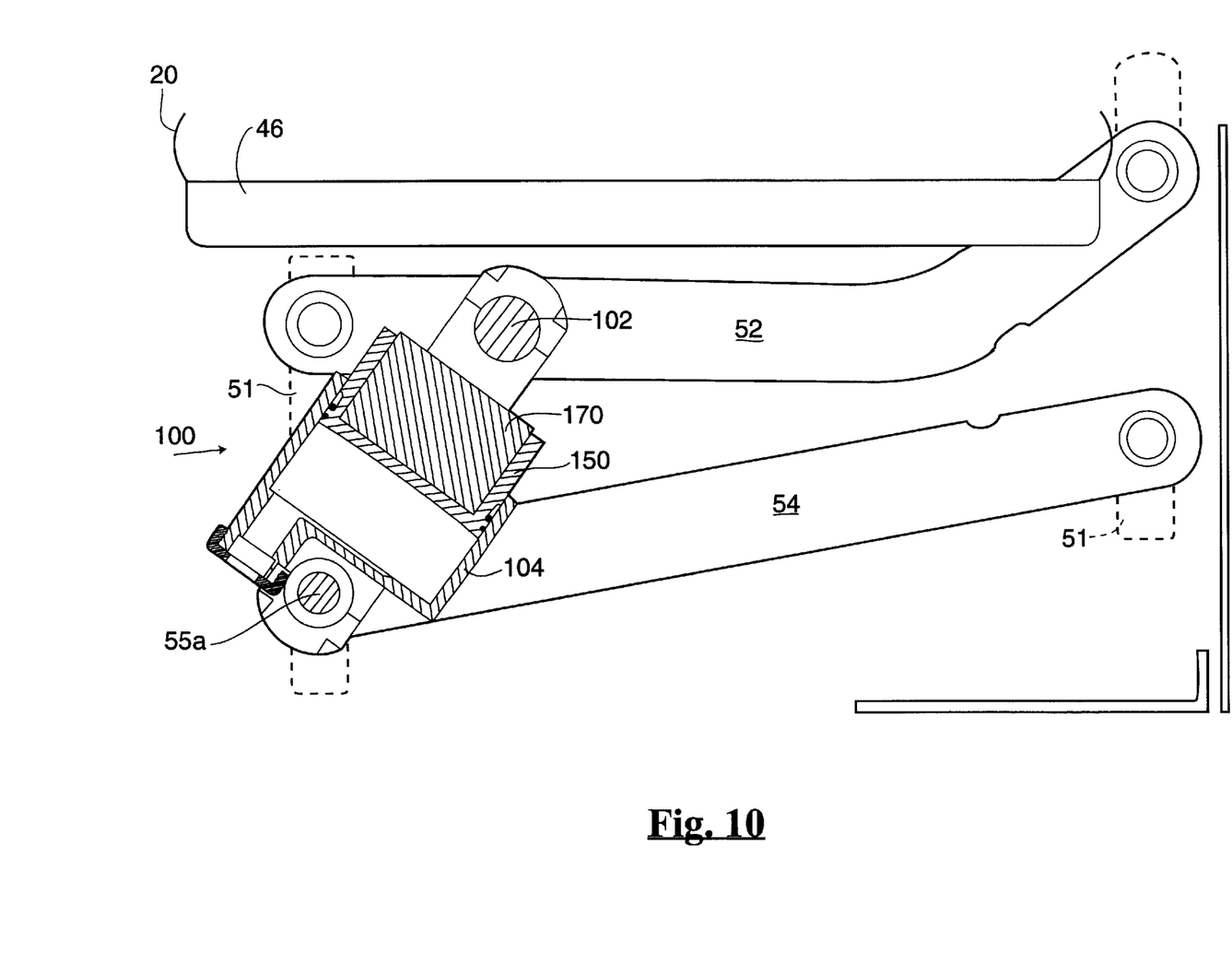
FIG. 10 is a partial view of a seat suspension system and also shows a seat retraction mechanism in an extended and locked mode of operation.

As the piston 150 is forced out of the housing 104 (see arrow 232) it similarly engages and moves the connecting rod 170 outwardly. The outward motion of the connecting rod urges the bars 55a and 102 apart thereby causing the seat to be lowered. Any slight inward motion of the piston 150, which would be caused by forces transmitted from the cross bar 55a and 102 to the connecting rod 170 as the suspension 40 attempts to move upwardly (which tends to lessen the spacing of the bars 42 and 54) causes the locking mechanism 220 to lock the piston in place. This locked condition, with the seat 40 at its lowered position is shown in FIG. 10. As can be appreciated, in this position, the connecting rod 170 is also fixed generally in place since any inward motion of the connecting rod 170 (which also corresponds to the upward motion of the seat) is prohibited as it abuts the piston 150 and any outward motion is prohibited since the bars 55a and 102 are effectively locked in place by the locked piston 150.

During an accident, the retractor 82 will become locked thereby preventing any protraction of the seat belt 76. As is known in the art, emergency locking retractors such as 82 include various mechanisms or electrical sensors which cause a lock bar to engage teeth of a lock wheel of a retractor spool. As the seat 20 is lowered by the operating of the seat retracting mechanism 100 the lap belt is permitted to slide through an opening or slot 87 on the tongue 86 effectively removing slack in the seat belt 76 and tightening the seat belt about the occupant.

Reference is again made to FIG. 3. If the amount of slack removed during the lowering of the seat 40 is deemed insufficient, the safety system 10 may further include a second means for tightening the seat belt about the occupant. The added belt tightening can be achieved by using a buckle pretensioner or belt tightener generally shown as 350. One such buckle pretensioning mechanism is shown in U.S. Pat. No. 5,533,756 which is incorporated herein by reference. Generally, these buckle pretensioning systems include a mechanism which foreshortens the anchor strap 320 to which the buckle 72 is connected. Instead of the buckle belt tightening device the seat belt can be tightened using a retractor pretensioner generally shown as 352. One such retractor pretensioner is shown in U.S. Pat. No. 5,489,072 which is also incorporated herein by reference. In this type of belt tightening or pretension system the spool associated with the retractor 82 is caused to reverse wind thereby eliminating the slack in the seat belt 76 and drawing the seat belt 76 tightly about the occupant, thereby limiting the motion of the occupant.

As can be appreciated, the seat retraction system defined above, as well as the occupant-belt pretensioning system will be activated during a crash. This activation can be done simultaneously or in stages, that is, the seat retraction mechanism 100 can first be activated thereby starting to lower the seat and shortly thereafter the occupant-belt pretensioning system to eliminate the seat belt web slack about the occupant. Alternatively, the occupant-belt tightening system might be activated first and the seat retraction system activated shortly thereafter.

Many changes and modifications in the above described embodiment of the invention can, of course, be carried out without departing from the scope thereof. As an example, the mechanism 100 can be used with a scissor type suspension mechanism in which one movable leg of the scissor suspension is pushed or pulled by the mechanism 100 to lower the seat. Accordingly, that scope is intended to be limited only by the scope of the appended claims.

We claim:
1. An occupant safety system comprising:
  seat suspension means (40, 52, 54) for supporting a seat and permitting the seat (20) to move relative to a vehicle floor, the seat suspension means including at least one movable member (52,54) which moves to a first determinable position as the seat is moved downward;
  seat lowering means (100) connected to the suspension means for moving the movable member thereby lowering the position of the seat relative to the floor to the first determinable position;
  wherein the seat lowering means (100) includes:
    a housing (104) defining a piston receiving cavity therein;
    a piston (150) movable in the piston receiving cavity, the piston including a connecting rod receiving cavity therein;
    a connecting rod (170) slidably received within the connecting rod receiving cavity and movable with the piston, wherein one of the housing and the connecting rod is connected to the seat suspension means and the other of the housing and the connecting rod is connected to the movable member;
    force producing means (130) for supplying products to cause the piston to move outwardly thereby causing the movable member (52,54) to move.

2. The system as defined in claim 1 wherein the seat lowering means includes stop means (220) for maintaining the suspension means and the seat at the first determinable position.

3. The system as defined in claim 1 wherein the suspension means includes at least two relatively movable members connected to the seat lowering means.

4. The system as defined in claim 1 wherein the housing and piston includes lock means for securing the piston relative to the housing thereby fixing the suspension means generally at the first determinable position.

5. The system as defined in claim 1 further including a seat belt system means (70) for securing an occupant to the seat, including a seat belt having a lap belt and a shoulder belt portion, wherein movement of the suspension means causes the seat belt to become tightened about the occupant.

6. The system as defined in claim 1 further including a seat belt system means (70) for securing an occupant to the seat, the seat belt system means including seat belt tightening means for eliminating any seat belt slack about an occupant.

7. An occupant safety system comprising:
  seat suspension means (40, 52, 54) for supporting a seat and permitting the seat (20) to move relative to a vehicle floor, the seat suspension means including at least one movable member (52,54) which moves to a first determinable position as the seat is moved downward;

seat lowering means (100) connected to the suspension means for moving the movable member thereby lowering the position of the seat relative to the floor to the first determinable position;

wherein the seat lowering means (100) includes:

a housing (104) defining a piston receiving cavity therein;

a piston (150) movable in the piston receiving cavity;

the housing and piston operatively connected to one of the seat suspension means and the movable member;

force producing means (130) for supplying products causing the piston to move thereby forcing the movable member (52,54) to the first determinable position.

8. A restraint system comprising:

a seat suspension means (40) for supporting a seat and permitting the seat to move relative to a vehicle floor, the seat suspension means being movable up and down during normal operation to locate the height of the seat at a location desired by an occupant thereof, the seat suspension means including at least two movable members (52,54) wherein respective portions of the at least two movable members move apart as the seat moves closer to the floor;

emergency seat lowering means (100) operative during a vehicular emergency for urging the movable members apart, thereby forcing the seat toward the floor to a lowered determinable position.

9. The system as defined in claim 8 wherein the seat lowering means includes mechanical lock means (220) for maintaining the seat at the determinable position.

10. The system as defined in claim 8 further including a seat belt system means (70) for securing an occupant to the seat, the seat belt system means including seat belt tightening means activated during an emergency, for eliminating any seat belt slack about an occupant.

11. A restraint system comprising:

a seat suspension means (40) for supporting a seat and permitting the seat to move relative to a vehicle floor, the seat suspension means including at least two movable members (52,54) which move apart as the seat moves closer to the floor;

seat lowering means (100) connected to the support element means for urging the movable members apart, thereby lowering the position of the seat relative to the floor to a first determinable position;

wherein the seat lowering means (100) includes:

a housing (104) defining a piston receiving cavity therein, the housing secured to a portion of the seat suspension means;

a piston (150) movable in the piston receiving cavity, the piston including a connecting rod receiving cavity therein;

a connecting rod (170), connected to one of the movable members and movable therewith, the connecting rod also being slidable within the connecting rod receiving cavity;

force producing means (130), communicated to the housing for supplying products to cause the piston to move outwardly thereby causing the connecting rod to move outwardly to separate the movable members (52,54).

12. The system as defined in claim 11 wherein the housing and piston includes stop means to limit the outward motion of the piston relative to the housing.

* * * * *